United States Patent [19]

Kang et al.

[11] Patent Number: 4,522,988

[45] Date of Patent: Jun. 11, 1985

[54] METHOD OF PREPARING HIGH CIS-1,4 DIENE POLYMERS HAVING GOOD GREEN STRENGTH AND TACK

[75] Inventors: Jung W. Kang, Clinton; James E. Hall, Akron, both of Ohio

[73] Assignee: The Firestone Tire & Rubber Company, Akron, Ohio

[21] Appl. No.: 616,767

[22] Filed: Jun. 4, 1984

[51] Int. Cl.$^3$ .................................................. C08F 4/26
[52] U.S. Cl. ................................... 526/133; 526/132; 502/119
[58] Field of Search ................ 526/132, 133, 137, 142

[56] References Cited

U.S. PATENT DOCUMENTS

| | | | |
|---|---|---|---|
| 3,170,904 | 2/1965 | Ueda et al. | 260/94.3 |
| 3,170,905 | 2/1965 | Ueda et al. | 260/94.3 |
| 3,170,907 | 2/1965 | Ueda et al. | 260/94.3 |
| 3,464,965 | 9/1969 | Yasunaga et al. | 260/94.3 |
| 3,471,462 | 10/1969 | Matsumoto et al. | 260/94.3 |
| 3,483,177 | 12/1969 | Throckmorton | 260/94.3 |
| 3,487,063 | 12/1969 | Throckmorton | 260/94.3 |
| 3,528,957 | 9/1970 | Throckmorton | 260/94.3 |
| 3,674,759 | 7/1972 | Yamawaki | 526/133 |
| 3,725,492 | 4/1973 | Ukita et al. | 260/680 B |
| 3,769,270 | 10/1973 | Saltman et al. | 260/94.3 |
| 3,856,764 | 12/1974 | Throckmorton | 260/94.3 |
| 3,910,869 | 10/1975 | Throckmorton | 260/94.3 |
| 3,985,941 | 10/1976 | Pierson et al. | 260/94.3 |
| 4,304,885 | 12/1981 | Omori et al. | 560/23 L |

FOREIGN PATENT DOCUMENTS 1499638  1/1978  United Kingdom .

*Primary Examiner*—Paul R. Michl
*Attorney, Agent, or Firm*—Frank J. Troy, Sr.

[57] ABSTRACT

Diene polymers having a high content of cis-1,4 addition are prepared by polymerizing a 1,3-diene monomer in a hydrocarbon solvent in the presence of a catalyst composition comprising (a) a carboxylated metal oxy borate compound in which the metal is nickel or cobalt, (b) an organometallic compound of a metal of Groups I, II, and III of the Periodic System, and (c) one or more fluorine containing compounds selected from the group consisting of boron trifluoride complexes with ethers, alcohols or mixtures thereof; hydrogen fluoride; hydrogen fluoride complexes with ethers, alcohols, or mixtures thereof and mixtures of said compounds.

The resultant polymers exhibit good green strength and tack and are particularly suitable for use as tire rubbers.

16 Claims, No Drawings

METHOD OF PREPARING HIGH CIS-1,4 DIENE POLYMERS HAVING GOOD GREEN STRENGTH AND TACK

BACKGROUND OF THE INVENTION

The invention relates to a method of preparing diene polymers having a high content of cis-1,4 addition along with good green strength and tack. More particularly, the invention relates to a method of preparing such polymers which involves polymerizing a 1,3-diene monomer in solution in the presence of a novel catalyst system which comprises a carboxylated metal oxy borate compound in which the metal is nickel or cobalt, an organometallic compound of a metal of Groups I, II, and III and one or more fluorine containing compounds.

Polybutadiene polymers having a high content of cis-1,4 addition and methods for their preparation are known in the art. Such polymers have been produced by polymerizing 1,3-butadiene under solution polymerization conditions using a wide variety of catalyst systems including catalyst compositions composed of various organonickel or organocobalt compounds, organometallic compounds of metals of Groups I, II, and III and various fluorine containing compounds.

Thus, U.S. Pat. No. 3,483,177 to Throckmorton, et al. relates to a method of preparing polybutadienes having a high content of cis-1,4 addition which comprises polymerizing 1,3-butadiene in solution in the presence of a catalyst system consisting of a mixture of: (1) organometallic compounds of the metals of Groups I, II, and III, including among which is disclosed trialkyl aluminum compounds; (2) at least one compound selected from the class consisting of organonickel or organocobalt compounds; and (3) at least one boron trifluoride complex prepared by complexing boron trifluoride with at least one member of the class selected from ketones, aldehydes, esters and nitriles, all members of the class having a carbon atom attached directly by a multiple bond to at least one atom selected from oxygen and nitrogen. At column 2, lines 13–21, there is described a prior art catalyst composition comprising triethyl aluminum, an organonickel salt and a boron trifluoride-diethyl ether complex.

U.S. Pat. No. 3,528,957 to Throckmorton, et al. relates to a method of preparing polybutadienes having a high content of cis-1,4 addition which comprises polymerizing 1,3-butadiene in solution in the presence of a catalyst system consisting of a mixture of: (1) organometallic compounds of metals of Groups, I, II, and III; (2) at least one compound selected from the class consisting of organonickel and organocobalt compounds; and (3) at least one boron trifluoride complex prepared by complexing boron trifluoride with a member of the class consisting of monohydric alcohols, phenols, water and mineral acids containing oxygen.

U.S. Pat. No. 3,985,941 to Pierson, et al. relates to a method of preparing polybutadienes having a high content of cis 1,4 addition which comprises polymerizing 1,3-butadiene in solution in the presence of a catalyst system consiting essentially of: (1) an organoaluminum compound selected from the group consisting of triisobutyl aluminum and tri-n-butyl aluminum; (2) an organonickel compound; and (3) a fluorinated mixture of hydrogen fluoride etherate and boron trifluoride etherate.

U.S. Pat. No. 4,304,885 to Omori, et al. relates to a polybutadiene rubber composition having high tack in the unvulcanized state which comprises a blend of a normally solid polybutadiene of high molecular weight with an extremely soft low molecular weight polybutadiene polymer. The patent discloses that both polymers are prepared by solution polymerization using various catalyst systems including catalyst systems consisting of organonickel compounds, trialkyl aluminum compounds and boron trifluoride etherates.

The aforementioned patents describe methods of preparing polybutadienes having high contents of cis-1,4 addition utilizing polymerization catalyst systems bearing some similarities to the catalyst systems employed in the method of the present invention.

However, there are a number of very important distinctions between the catalyst systems employed in the processes of this prior art and the catalyst systems used in the method of the invention which affect both the nature of the polymerization and the properties of the resultant polybutadiene polymers. Thus, none of the above mentioned patents disclose or suggest that the polybutadiene polymers produced by the methods described therein exhibit both good green strength and tack. In fact, as pointed out in U.S. Pat. No. 4,242,232, one of the major disadvantages of high cis-1,4 polybutadiene polymers produced by catalyst compositions of the prior art which utilize transition metals such as titaium, cobalt, and nickel, is inferior tack as compared to natural rubber.

U.S. Pat. No. 4,304,885 does teach that the polybutadiene rubber compositions described therein have high tack. However, in accordance with the teachings of the patent, this high tack property is achieved by blending a high molecular weight polybutadiene with a low molecular weight polybutadiene and this appears to be the case even though the reference recommends the use of catalyst systems for preparing the polymers which are at least analogous to those described in the above patents.

Moreover, U.S. Pat. Nos. 3,483,177; 3,528,957; and 3,985,941 all clearly teach that when certain boron trifluoride complexes, such as, for example, boron trifluoride etherates are employed in the catalyst system and the organometallic compound employed is a trialkyl aluminum compound, the selection of the trialkyl aluminum component is extremely limited. Thus, these patents all teach that in such instances the trialkyl aluminum compound should be limited to triethyl aluminum or trimethyl aluminum if optimum reaction rates and polymer molecular weights are to be obtained. This is in complete contrast to the catalyst composition of the present invention in which the trialkyl aluminum component is not so limited.

Finally, the organonickel or organocobalt components of the catalyst systems of the aforementioned prior art patents are entirely different from the carboxylated metal oxy borate component of the catalyst system of the present invention. As will be discussed hereinafter, this component of applicants' catalyst system is of major significance in producing polybutadienes having both a high content of cis-1,4 addition and good green strength and tack.

SUMMARY OF THE INVENTION

In accordance with the present invention, diene polymers having a high content (i.e., >85%) of cis-1,4 addition as well as good green strength and tack are prepared by polymerizing a 1,3-diene monomer in hydrocarbon solvent solution in the presence of a catalytically effective amount of a catalyst composition which comprises:

(a) a carboxylated metal oxy borate compound selected from the group consisting of compounds of the formula (RCOOMO)$_3$B and (RCOOMO)$_2$B—OR' and mixtures thereof, wherein R and R' are alkyl radicals containing from 7 to 17 carbon atoms, and M is nickel or cobalt;

(b) an orgaometallic compound of a metal of Groups I, II, and III of the Periodic System; and (c) one or more fluorine containing compounds selected from the group consisting of boron trifluoride complexes with ethers, alcohols, or mixtures thereof; hydrogen fluoride; hydrogen fluoride complexes with ethers, alcohols, or mixtures thereof and mixtures of said compounds.

In addition to producing diene polymers having a high content of cis-1,4 addition, good green strength and tack, the catalyst compositions of the invention have considerably more versatility than those described in the aforementioned prior art. Thus, even in instances where the fluorine containing compound employed as component (c) of the composition is a boron trifluoride etherate, such as boron trifluoride diethyl ether and a trialkyl aluminum compound is employed as component (b), it is not necessary to limit the trialkyl aluminum component to trimethyl aluminum or triethyl aluminum. In fact, an especially advantageous trialkyl aluminum compound for use in such compositions is triisobutyl aluminum.

DETAILED DESCRIPTION OF THE INVENTION

As indicated, the high cis-1,4 diene polymers produced by the method of the invention are prepared by polymerizing a 1,3-diene monomer in the presence of the novel catalyst composition. 1,3-diene monomers which may be employed are conjugated dienes and include 1,3-butadiene, isoprene, 1,3-pentadiene and the like. The preferred 1,3-diene monomer is 1,3-butadiene.

The carboxylated metal oxy borate compounds which are employed as component (a) of the catalyst composition of the invention are compounds having either of the structures:

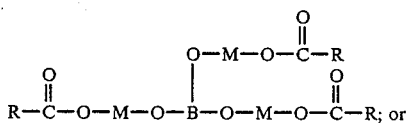

(1)

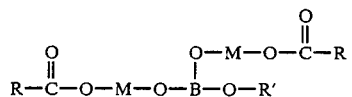

(2)

wherein R and R' are alkyl radicals containing from 7 to 17 carbon atoms, and M is nickel or cobalt. It should be noted that in certain instances, compounds in which R is less than 7 may be employed although the use of such compounds is not preferred due to their lack of solubility in hydrocarbon solvents. Nonetheless, such compounds may be utilized with certain mixtures of solvents. For the sake of convenience, these compounds may be represented by the shorthand formulae (RCOOMO)$_3$B or (RCOOMO)$_2$BOR', wherein R, R', and M are as defined above.

These carboxylated metal oxy borate compounds, such as the carboxylated nickel borate or the carboxylated cobalt borate, may be prepared by methods known in the art such as, for example, by reacting a nickel or cobalt salt of a carboxylic acid with an alkoxide of boron as described in detail in U.S. Pat. No. 3,296,242, the disclosure of which is incorporated herein by reference. The preferred carboxylated metal oxy borate compounds employed in the catalyst compositions of the invention are those represented by the formula (RCOOMO)$_3$B, wherein M is nickel or cobalt and R is an alkyl radical of from 7 to 11 carbon atoms. Also, for the sake of convenience, the carboxylated metal oxy borate compounds of the invention are hereinafter referred to as simply cobalt borates and nickel borates which in the examples are designated by the abbreviations CoOB and NiOB, respectively.

The carboxylated nickel and cobalt borates of the catalyst compositions herein are believed to be completely distinguishable from the organonickel and organocobalt components of the catalyst compositions disclosed in the above-mentioned prior art patents. Thus, these compounds may, in fact, be regarded as semi-inorganic nickel and cobalt compounds in view of the presence of the central boron atom. Moreover, a surprising and unexpected feature of these cobalt and nickel borate compounds is that even in the absence of fluorine containing compound cocatalysts such as boron trifluoride complexes, these compounds, in the presence of an organometallic compound reducing agent such as trialkyl aluminum, exhibit some catalytic activity in the polymerization of 1,3-butadiene. This is in complete contrast to the organocobalt and organonickel compounds of the foregoing prior art patents which to applicants' knowledge exhibit virtually no catalytic activity in the absence of boron trifluoride complex cocatalysts and is further evidence of the fact that the carboxylated cobalt and nickel borates of the invention differ from the organocobalt and organonickel compounds of the prior art.

It should be noted at this point that the carboxylated cobalt and nickel borate compounds of the invention have been utilized heretofore as rubber to metal adhesion promoters as described in U.S. Pat. No. 4,057,529. However, insofar as applicants are aware, prior to this invention such compounds have not been employed as polymerization catalysts components in the preparation of polybutadiene polymers.

The organometallic compounds of Groups I, II, and III, which may be utilized as component (b) of the catalyst system, are organometallic compounds of metals such as lithium, potassium, sodium, zinc, magnesium and aluminum. The preferred organometallic compounds are the organolithium, organoaluminum, organozinc and organomagnesium compounds and of these, the organolithium and organoaluminum compounds are particularly preferred.

The term "organoaluminum compound", as employed herein, refers to organoaluminum compounds which correspond to the formula:

wherein R₁ is selected from the group consisting of alkyl (including cycloalkyl), aryl, alkaryl, arylalkyl, alkoxy, fluorine, and hydrogen, R₂ and R₃ being selected from the group of alkyl (including cycloalkyl), aryl, alkaryl, and arylalkyl.

Illustrative examples of compounds corresponding to the above formula which may be utilized include diethyl aluminum fluoride, di-n-propylaluminum fluoride, di-n-butylaluminum fluoride, diisobutylaluminum fluoride, dioctylaluminum fluoride, diphenylaluminum fluoride, trimethyl aluminum, triethyl aluminum, tri-n-propyl aluminum, triisopropyl aluminum, tri-n-butyl aluminum, triisobutyl aluminum, tripentyl aluminum, trihexyl aluminum, tricyclohexyl aluminum, trioctyl aluminum, triphenyl aluminum, tri-p-tolyl aluminum, tribenzyl aluminum, ethyl diphenyl aluminum, ethyl di-p-tolyl aluminum, ethyl dibenzyl aluminum, diethyl phenyl aluminum, diethyl p-tolyl aluminum, diethyl benzyl aluminum, and other triorganoaluminum compounds. Also included are dialkylaluminum alkoxides such as diethylaluminum ethoxide, diisobutylaluminum ethoxide, dipropylaluminum methoxide, and the like. Hydrides of such organoaluminum compounds may also be utilized including diethyl aluminum hydride, di-n-propyl aluminum hydride, di-n-butyl aluminum hydride, diisobutyl aluminum hydride, diphenyl aluminum hydride, di-p-tolyl aluminum hydride, dibenzyl aluminum hydride, phenyl ethyl aluminum hydride, phenyl n-propyl aluminum hydride, p-tolyl ethyl aluminum hydride, p-tolyl n-propyl aluminum hydride, p-tolyl isopropyl aluminum hydride, benzyl ethyl aluminum hydride, benzyl n-propyl aluminum hydride, and benzyl isopropyl aluminum hydride and the like.

The preferred organoaluminum compounds are the trialkyl aluminum compounds such as trimethyl aluminum, triethyl aluminum, tri-n-propyl aluminum, tri-n-butyl aluminum, triisobutyl aluminum, trioctyl aluminum and the like, and of these, triisobutyl aluminum is particularly preferred.

The term "organolithium compounds", as employed herein, refers to organolithium compounds which correspond to the formula RLi, wherein R is a hydrocarbyl radical of 1-20 carbon atoms, advantageously an aliphatic radical of 1-20, preferably 3-6 carbon atoms, but also may be cycloaliphatic or aromatic of 6-20, preferably 6-12 carbon atoms. Preferred RLi compounds are n-butyl and sec-butyl lithium. Other suitable RLi compounds include but are not restricted to those in which the R groups are ethyl, n-propyl, isopropyl, n-amyl, sec-amyl, sec-hexyl, n-hexyl, n-heptyl, octyl, nonyl, decyl, dodecyl, octadecyl, phenyl, tolyl, dimethylphenyl, ethylphenyl, naphthyl, cyclohexyl, methylcyclohexyl, ethylcyclohexyl, cycloheptyl, allyl, 2-butenyl, 2-methyl butenyl, cyclopentylmethyl, methycyclopentylethyl, phenylethyl, cyclopentadienyl, naphthyl, penylcyclohexyl, and the like.

The term "organomagnesium compounds" as employed herein refers first to organomagnesium complexes corresponding to the formula $R_aMgX_b$, wherein R may be alkyl, aryl, arylalkyl or alkaryl; X is fluorine and a and b are mole fractions whose sum equals 2 while the ratio a/b is greater than 2 but is not infinite. Illustrative of compounds corresponding to the above formula are ethylmagnesium fluoride, cyclohexylmagnesium fluoride, and phenylmagnesium fluoride and the like. Also included in the term "organomagnesium compounds" are compounds of the formula $R_2Mg$, wherein R may be alkyl, aryl, arylalkyl or alkaryl or R'R''Mg, wherein R' may be alkyl, aryl or alkaryl and R'' may be either alkyl, aryl, arylalkyl or alkaryl. Illustrative of compounds corresponding to these latter formulae are dimethylmagnesium, diethylmagnesium, dipropylmagnesium, di(n-s-t)butylmagnesium, diphenylmagnesium, and the like.

The term "organozinc compounds", as employed herein, refers to organozinc compounds corresponding to the formula $R_2Zn$, wherein R may be alkyl, aryl, arylalkyl or alkaryl. Illustrative of compounds corresponding to the above formula are diethylzinc, dibutylzinc, and diphenylzinc.

Fluorine containing compounds which may be utilized as component (c) of the catalyst compositions herein include boron trifluoride complexes with ethers, alcohols or mixtures thereof; hydrogen fluoride and hydrogen fluoride complexes with ethers, alcohols or mixtures thereof. Mixtures of the foregoing fluorine containing compounds may also be employed. The preferred fluorine containing compounds for use in the catalyst composition of the invention are the boron trifluoride complexes.

Ethers which may be utilized in forming the complexes may be represented by the formula R'OR wherein R and R' are selected from the group consisting of alkyl, cycloalkyl, aryl, alkaryl and arylalkyl radicals containing from 1 to 30 carbon atoms and R and R' may be the same or different. The R's may also be joined through a common carbon bond to form a cyclic ether with the ether oxygen being an integral part of the cyclic structure such as tetrahydrofuran, furan, or dioxane. Illustrative examples of ethers which may be suitably employed include dimethyl, diethyl, dibutyl, diamyl, and diisopropyl ethers, ethyl methyl ether, dibenzyl ether and the like. The preferred ether complexes are boron trifluoride diethyl etherate, boron trifluoride dibutyl etherate, hydrogen fluoride diethyl etherate and hydrogen fluoride dibutyl etherate.

Alcohols which may be utilized in forming the complexes may be represented by the formula ROH wherein R is selected from the group consisting of alkyl, cycloalkyl, aryl, and arylalkyl radicals containing from 1 to 30 carbon atoms. Illustrative examples of alcohols which may be suitably employed include methanol, ethanol, n-propanol, isopropanol, n-butanol, hexanol, cyclohexanol, pentanol, octanol, decanol, dodecanol, benzyl alcohol, 2-phenol and the like. The preferred alcohol complexes are $BF_3$·Ethanol, $BF_3$·Octanol, HF·Ethanol and HF·Octanol and of these $BF_3$·Ethanol and $BF_3$·Octanol are particularly preferred.

The complexes may be prepared by various procedures. Thus, the boron trifluoride or hydrogen fluoride complexes may be prepared by simply dissolving appropriate amounts of the ether or alcohol complexing agents in a suitable solvent and appropriate amounts of the boron trifluoride or hydrogen fluoride in a suitable solvent and then mixing the two solvent systems. The mixing should be conducted in the absence of water vapor. An additional method would be to dissolve the boron trifluoride or hydrogen fluoride in a suitable solvent and then add the alcohol or ether to the resulting solution. Alternatively, the complexes could be prepared by dissolving the alcohol or ether complexing agent in a suitable solvent and then bubble the gaseous boron trifluoride or hydrogen fluoride through the system until all of the complexing agent has reacted. As illustrated in certain of the examples below, the boron trifluoride-alcohol complexes can also be prepared by means of a substitution reaction in which the alcohol is reacted with a boron trifluoride-ether complex.

The three catalyst components interreact to form the active catalyst. Accordingly, the optimum concentration for any one component is dependent upon the concentration of each of the other components. In the catalyst system of this invention, the polymerization of a 1,3-diene monomer to diene polymer may be conducted using a broad range of catalyst component concentrations. Thus, the molar ratio of catalyst components a:b:c (defined above) may range from about 1:1:1 to about 1:70:70. The preferred molar ratios of a:b:c are from 1:1.5:1.5 to 1:15:15.

The three catalyst components may be introduced into the polymerization system in several ways. Thus, the three catalyst components may be charged to a solution of the 1,3-diene in a stepwise or simultaneous manner which is commonly referred to in the polymerization art as an "in-situ" catalyst charge procedure. Alternatively, the catalyst may also be preformed outside of the polymerization system by a procedure in which all of the catalyst components are mixed in the presence of a small amount of 1,3-diene monomer in an inert diluent and the complete blend is then added to the polymerization system. Additionally, the catalyst components may be introduced to the polymerization system using a two stage procedure in which a ¶ allyl nickel or cobalt complex is preformed outside the reactor in the first stage. This procedure involves first charging the organometallic component, preferably in an inert diluent, to a blend or solution of 1,3-diene in an inert diluent. Then, the nickel borate or cobalt borate compound, preferably in an inert diluent, is added to the system. The resulting blend is then heated at an appropriate temperature (e.g., from about −20° C. to about 80° C.) for an appropriate time (e.g., from about 0 to about 30 minutes) to form the ¶ allyl nickel or cobalt complex, the formation of which is generally evidenced by the solution taking on a pale yellow to orange color. Following this step, the fluorine containing compound and preformed ¶ allyl complex are added to the polymerization system. In addition, the ¶ allyl complex may be formed in-situ in the reactor by charging the organometallic compound and cobalt borate or nickel borate compound to a reactor containing the 1,3-diene to be polymerized and then heating the resultant mixture. These latter procedures involving the formation of the ¶ allyl complex are the preferred procedures for use in the present invention.

The concentration of the total catalyst composition employed in the method of the invention can vary considerably and is dependent upon factors such as purity, rate of polymerization desired, temperature, and the like. Accordingly, specific overall concentrations of the catalyst compositions cannot be set forth except to state that such concentrations are catalytically effective amounts. Some specific concentrations and ratios which produce polybutadiene polymers having the desired properties are illustrated in the examples below.

The polymerizations of this invention are conducted in an inert hydrocarbon solvent and are consequently solution polymerizations. The term "inert solvent" means that the solvent does not enter into the structure of the resulting polymer, does not adversely affect the properties of the resulting polymer and does not adversely affect the activity of the catalyst employed. Suitable hydrocarbon solvents which may be employed include aliphatic, aromatic or cycloaliphatic hydrocarbons such as hexane, pentane, toluene, benzene, cyclohexane and the like. The preferred hydrocarbon solvents are aliphatic hydrocarbons and of these hexane is particularly preferred.

The polymerizations of the invention should be carried out under an inert atmosphere such as nitrogen and precautions should be taken to exclude materials such as water and air which will deactivate the catalyst components.

The temperatures employed in the polymerization are not critical and may range from about −10° C. to about 150° C. Preferred polymerization temperatures may range from about 50° to about 130° C. It should be noted here that one of the significant advantages of the use of the catalyst compositions of the invention is that they provide the capability of more consistently using higher polymerization temperatures than those which have heretofore been actually exemplified in most prior art catalyst systems.

The polymerizations may be terminated in well known manner by the addition of a small amount of a lower alkanol such as methanol and an antioxidant such as di-t-butyl cresol.

The diene polymer product can be recovered from solution in known manner by coagulation in an excess of methanol or other lower alkanol. The polymer product can be dried using any convenient method such as vacuum drying, drum drying, extruder drying, and the like.

As mentioned above, the diene polymers produced by the method of the invention have a high content of cis-1,4 addition along with good green strength and tack. Thus, such diene polymers have cis-1,4 addition contents of >85% and more commonly from about 90 to about 99%.

The following examples are submitted for the purpose of further illustrating the nature of the present invention and are not to be regarded as a limitation on the scope thereof. Parts and percentages shown in the examples are by weight unless otherwise indicated.

In Examples 1–6 which follow, polybutadiene polymers were prepared using cobalt borates as component (a) of the catalyst composition and the method of catalyst addition was varied.

EXAMPLE 1

To a one gallon stainless steel reactor equipped with thermometer, stirrer, heating means, pressure means, inlet and outlet ports which was maintained under a nitrogen atmosphere was charged 2200 grams of a 1,3-butadiene/hexane blend (hereinafter BD/Hexane) containing 450 grams of 1,3-butadiene.

The catalyst composition used in this example consisted of the following components: (1) a cobalt borate compound having a formula $(RCOOCoO)_3B$, in which R is an alkyl radical containing from 7 to 11 carbon atoms, containing from 15.5 to 16.5 percent by weight of cobalt obtained from Manchem, Inc. under the designation Manobond C-16 (this compound is hereinafter referred to by the abbreviation CoOB); (2) triisobutyl aluminum (hereinafter reffered to by the abbreviation TIBAL) and (3) boron trifluoride diethyl ether (hereinafter referred to by the abbreviation BF₃OEt₂).

The active catalyst was preformed outside of the reactor by charging the following components to a 10 ounce crown capped beverage bottle in the following order: (1) 100 mililiters (ml) of a BD/Hexane blend containing 15% by weight of 1,3-butadiene; (2) CoOB in an amount sufficient to provide 0.4 milimoles (hereinafter mM) of cobalt metal per hundred grams of monomer (hereinafter phgm); (3) TIBAL in an amount sufficient to provide 4.0 mM of aluminum metal phgm; and (4) BF₃OEt₂ in an amount sufficient to provide 5.6 mM phgm (see note below). The bottle was then heated in a water bath as described in the specification above. The catalyst mixture exhibited a dark brown color and was slightly viscous due to polymerization of the 1,3-butadiene. The catalyst was then aged for 15 minutes at room temperature.

The resultant preformed catalyst was then charged to the reactor which was maintained at a temperature of 70° C. 10° C. Polymerization of the 1,3-butadiene in the reactor in the presence of this preformed catalyst was then conducted in this temperature range for a period of five (5) hours. Polymerization was terminated by adding a small amount of methanol and an antioxidant to the reactor. The resultant polybutadiene polymer was then recovered from solution by coagulation in excess methanol and dried by drum drying. The resultant polymer was then evaluated for various physical properties.

Note: As indicated, the moles of catalyst component are based upon the actual metal content of the catalyst compound rather than on total molecular weight of the compound. Moles and molar ratios of catalyst components in all of the examples which follow are reported on the same basis.

The weights and molar ratios of the various components used in the polymerization, the polymerization conditions, and the properties of the resultant polymer are shown in Table I.

EXAMPLE 2

In this example, Example 1 was substantially repeated except that the BD/Hexane blend charged to the reactor contained 450 grams of 1,3-butadiene and the preformed catalyst was prepared using different molar ratios of catalyst components.

The weights and molar ratios of the various components used in the polymerization, the polymerization conditions, and the properties of the resultant polymer are shown in Table I.

EXAMPLE 3

In this example, the first step of Example 1 involving the charging of the BD/Hexane blend to the reactor was substantially repeated except that the BD/Hexane blend contained 450 grams of 1,3-butadiene and the reactor was maintained at a temperature of 65° C.±10° C. However, in this instance, the active catalyst was formed by the in-situ procedure. In this procedure, the catalyst components were each charged to the reactor separately in the following sequence: (1) CoOB dissolved in hexane; (2) TIBAL dissolved in hexane; and (3) BF₃OEt₂ dissolved in a BD/Hexane containing 15% by weight of 1,3-butadiene. The polymerization was conducted for 5 hours, terminated and the resultant polymer recovered as in Example 1.

The weights and molar ratios of the various components used in the polymerization, the polymerization conditions, and the properties of the resultant polymer are shown in Table I.

EXAMPLE 4

In this example, Example 3 was substantially repeated with the exception that the BD/Hexane blend charged to the reactor contained 418 grams of 1,3-butadiene and the reactor was maintained at a temperature of 70° C.±10° C., the ratios of the catalyst components were varied, a second charge of CoOB was added to the reactor and polymerization was conducted for a period of 3 hours. Thus, the catalyst components were first charged to the reactor in the following amounts and in the following sequence: (1) CoOB; (2) TIBAL; and (3) BF₃OEt₂. After polymerization had proceeded for 90 minutes, a second charge of CoOB was added to the reactor. This procedure resulted in quantitative conversion of monomer to polymer.

The weights and molar ratios of the various components used in the polymerization, the polymerization conditions, and the properties of the resultant polymer are shown in Table I.

EXAMPLES 5-6

In these examples, a procedure similar to that of Example 3 was employed with the exception that the TIBAL and BF₃OEt₂ catalyst components were charged to the reactor along with the 1,3-butadiene/hexane blend. The reactor temperature was then raised to 80° C.±10° C. The CoOB catalyst component diluted in 500 ml of Hexane was then pumped slowly into the reactor over a 90 minute period. The polymerization was conducted at the above temperature over a period of 3 hours and the polymerization was terminated and the polymer recovered and dried as in Example 1.

The weights and molar ratios of the various components used in the polymerization, the polymerization conditions, and the properties of the resultant polymer are shown in Table I-A.

TABLE I

| Example # | 1 | 2 | 3 | 4 |
|---|---|---|---|---|
| 1,3-BD, % | 19.25 | 19.0 | 18.5 | 17.4 |
| 1,3-BD, grams | 450 | 445 | 445 | 418 |
| CoOB, mM phgm | 0.4 | 0.6 | 0.6 | 0.8 |
| TIBAL, mM phgm | 4.0 | 10.0 | 10.0 | 11.7 |
| BF₃OEt₂, mM phgm | 5.6 | 10.0 | 10.0 | 16.8 |
| Molar Ratios: | | | | |
| Co/AL/B | 1/10/14 | 1/16.7/16.7 | 1/16.7/16.7 | 1/14.6/21 |
| Type Catalyst Addition | Preformed Aged 15 minutes | Preformed Aged 15 minutes | In-situ | In-situ 2 addn. of CoOB |
| Polymerization Conditions: | | | | |
| Temp °C. | 70 ± 10 | 70 ± 10 | 65 ± 10 | 70 ± 10 |
| Time-Hrs. | 5 | 5 | 5 | 5 |
| Conversion % | 78% | 53% | 72% | 99% |
| Polymer Properties Microstructure | | | | |
| % Cis-1,4 | 91.6 | 93.5 | 91.2 | 93.3 |
| % Trans-1,4 | 3.0 | 2.1 | 2.5 | 2.4 |
| % 1,2 | 5.4 | 4.4 | 6.3 | 4.3 |
| $\overline{Mw}$ | 511,000 | 413,000 | 373,000 | 344,000 |
| $\overline{Mw}/\overline{Mn}$ | 6.70 | 6.06 | 9.48 | 6.14 |
| ML-4 at 100° C. | 65.2 | 44.1 | 42.0 | 33.4 |

TABLE I-A

| Example # | 5 | 6 |
|---|---|---|
| 1,3-BD, % | 15.1 | 15.0 |
| 1,3-BD, grams | 320 | 320 |
| CoOB, mM phgm | 0.32 | 0.32 |
| TIBAL, mM phgm | 12.8 | 8.8 |
| BF₃OEt₂, mM phgm | 19.2 | 13.2 |
| Molar Ratios: | | |
| Co/AL/B | 1/40/60 | 1/27.5/40 |
| Type Catalyst | In-situ | In-situ |
| Addition | Continuous Addition of CoOB over 90 minutes | |
| Polymerization Conditions: | | |
| Temp °C. | 80 ± 10 | 80 ± 10 |
| Time-Hrs. | 3 | 3 |
| Conversion % | 96% | 95% |
| Polymer Properties Microstructure | | |
| % Cis-1,4 | 94.8 | 94.4 |
| % Trans-1,4 | 1.9 | 2.1 |
| % 1,2 | 3.3 | 3.5 |
| $\overline{Mw}$ | 477,000 | 516,000 |
| $\overline{Mw}$ / $\overline{Mn}$ | 4.72 | 5.73 |
| ML-4 at 100° C. | 68.2 | 83.0 |

EXAMPLE 7

This example illustrates the use of a nickel borate compound as component (a) of the catalyst system. The nickel borate compound utilized in the example had essentially the same structural formula as the cobalt borate compound utilized in Example 1 and is, therefore, the nickel borate analogue of the cobalt borate compound. In the examples which follow, these nickel borate compounds are referred to by the abbreviation NiOB.

To each of a series of five (5) 28 ounce beverage bottles equipped with rubber liner and three hole crown cap were charged 270 grams of purified BD/Hexane blend containing 65 grams of 1,3-butadiene. Then, the catalyst components were charged to each bottle in the following order: (1) TIBAL (18 weight %) in Hexane; (2) BF₃OEt₂ (neat); and (3) NiOB in hexane. The amounts of NiOB added to each bottle were varied with the overall ratio of catalyst components being kept the same. After addition of catalyst components were completed, the polymerization was conducted at varying temperatures in a water bath for 18 hours. Polymerization was terminated with a small amount of methanol and an antioxidant. The resultant polymer was recovered by coagulation with excess methanol and dried using a drum drier.

The weights and molar ratios of the various components used in the polymerization, the polymerization conditions and the polymer properties are shown in Table II.

TABLE II

| Run # | A | B | C | D | E |
|---|---|---|---|---|---|
| 1,3 BD, grams | 65.0 | 65.0 | 65.0 | 65.0 | 65.0 |
| NiOB, mM phgm | 0.138 | 0.138 | 0.069 | 0.069 | 0.069 |
| TIBAL, mM phgm | 1.4 | 1.4 | 0.69 | 0.69 | 0.69 |
| BF₃OEt₂, mM phgm | 19.3 | 19.3 | 9.7 | 9.7 | 9.7 |
| Molar Ratios | | | | | |
| Ni/AL/B | 1/10/14 | → | → | → | → |
| Type Catalyst Addition | In-situ | → | → | → | → |
| Polymerization Conditions: | | | | | |
| Temp. °C. | 50 | 50 | 30 | 50 | 70 |
| Time-Hrs. | 18 | 18 | 18 | 18 | 18 |
| Conversion % | 96.3 | 100.0 | 94.2 | 95.8 | 95.4 |
| Polymer Properties Microstructure | | | | | |
| % Cis-1,4 | 97.8 | 98.0 | 99.1 | 98.3 | 98.2 |
| % Trans-1,4 | 1.4 | 1.4 | 0.6 | 1.2 | 1.1 |
| % 1,2 | 0.8 | 0.6 | 0.3 | 0.5 | 0.7 |
| DSV | 1.50 | 1.56 | 2.51 | 1.88 | 1.94 |

EXAMPLES 8-12

In these examples, the procedure employed in Examples 5-6 was substantially followed with the exceptions that the BD/Hexane blend charged to the reactor contained 356 grams of 1,3-butadiene, the concentrations of TIBAL and BF₃OEt₂ were kept constant and CoOB, NiOB, and mixtures thereof, were employed as component (a) of the catalyst composition with the total level of transition metal (TM) maintained at a constant level.

The weights and molar ratios of the various components used in the polymerization, the polymerization conditions, and the properties of the resultant polymer are shown in Table III. The polymers produced in these examples were also evaluated for green strength, which refers to the strength, cohesiveness and dimensional stability of rubber compounds in the unvulcanized state, and tack. Green strength was determined in known manner by compounding the polymers using conventional rubber compounding procedures and equipment utilizing a standard rubber formulation having the following recipe in parts by weight: polymer=100, carbon black=50, zinc oxide=7.5, stearic acid=2.0, resin=5.0, naphthenic oil=5.0, sulfenamide=1.0, and sulfur=1.2. For comparative purposes, two commercial high cis-1,4 polybutadiene polymers were included as controls and are designated Examples A and B, respectively. Green strength and tack results are shown in Table III(a).

TABLE III

| Example # | 8 | 9 | 10 | 11 | 12 |
|---|---|---|---|---|---|
| 1,3 BD, % | 16.0 | 16.0 | 16.1 | 16.0 | 15.9 |
| 1,3 BD, grams | 356 | 356 | 356 | 356 | 356 |
| CoOB, mM phgm | 0.0 | 0.18 | 0.27 | 0.32 | 0.36 |
| NiOB, mM phgm | 0.36 | 0.18 | 0.09 | 0.04 | 0.0 |
| TIBAL, mM phgm | 9.0 | 9.0 | 9.0 | 9.0 | 9.0 |
| BF₃OEt₂, mM phgm | 18.0 | 18.0 | 18.0 | 18.0 | 18.0 |
| Molar Ratios: | | | | | |
| TM/AL/B | 1/25/50 | → | → | → | → |
| Co/Ni % | 0/100 | 50/50 | 75/25 | 89/11 | 100/0 |
| Type Catalyst Addition | In-situ | → | → | → | → |
| | Continuous addition of the transition metal over 90 minute period. | | | | |
| Polymerization Conditions: | | | | | |
| Temp. °C. | 80 ± 10 | 80 ± 10 | 80 ± 10 | 80 ± 10 | 80 ± 10 |
| Time-Hrs. | 3 | 3 | 3 | 3 | 3 |
| Conversion % | 89% | 92% | 93% | 93% | 93% |
| Polymer Properties Microstructure | | | | | |
| % Cis-1,4 | 97.8 | 96.6 | 94.6 | 94.2 | 94.0 |
| % 1,2 | 1.7 | 2.0 | 2.9 | 3.2 | 3.4 |
| ML-4 at 100° C. | 47.0 | 58.0 | 60.5 | 87.1 | 86.1 |

TABLE III-A

| Polymer Example | Green Strength | | | Elong. % | Tack PPI*** |
|---|---|---|---|---|---|
| | Initial PSI | Peak PSI | Break PSI | | |
| A (Control)* | 20 | 32 | 26 | 610 | 0 |
| B (Control)** | 20 | 35 | 30 | 910 | 0 |
| 8 | 25 | 50 | 50 | 1250 | 6.5 |
| 9 | 35 | 94 | 94 | 1030 | 5.5 |
| 10 | 31 | 91 | 92 | 855 | 3.5 |
| 11 | 41 | 148 | 148 | 805 | 4.0 |
| 12 | 40 | 188 | 188 | 675 | 2.0 |

*A cobalt-catalyzed polybutadiene polymer having a cis-1,4 content of 98% and a Mooney viscosity, ML-4 at 100° C. of 50, available from Polysar under the designation CB220.
**A nickel-catalyzed polybutadiene polymer having a cis-1,4 content of 97% and a Mooney viscosity, ML-4 at 100° C. of 45, available from Goodyear under the designation Budene.
***PPI means pounds per inch.

As will be evident from the above data, high cis-1,4 polybutadiene polymers produced by the method of the invention exhibit much better green strength and tack than the conventional control polybutadienes.

EXAMPLE 13

To a 2 gallon stainless steel reactor equipped as in Example 1 and maintained under a nitrogen atmosphere was charged at room temperature 3632 grams of a purified BD/Hexane blend containing 18 weight % of 1,3-butadiene. The catalyst components were charged to the reactor separately in the following order: (1) TIBAL in an amount sufficient to provide 6.53 mM of AL phgm and $BF_3OEt_2$ in an amount sufficient to provide 9.14 mM of B phgm in 120 grams of purified BD/Hexane blend containing 30 weight % of 1,3-butadiene and (2) NiOB in an amount sufficient to provide 0.653 mM of nickel phgm in 50 ml of Hexane. Molar ratio Ni/AL/B=1/10/14. Polymerization was conducted at 70° C.±10° C. for six hours with samples being drawn from the reactor at one hour intervals to determine conversion of monomer to polymer. The conversion results were as follows: 1 hour=68%; 2 hours=81.4%; 3 hours=84.5%; 4 hours=87.9%; 5 hours=92.5%; and 6 hours=95.2%.

After the polymerization period was concluded, the polymer cement was dropped into a mixture of isopropanol (2 gallons) and 1 liter of water containing an antioxidant, coagulated and dried as in Example 13.

The resultant polymer was then analyzed and tested for various properties. Results were as follows:

| | |
|---|---|
| DSV | 2.60 |
| % Gel | 0 |
| ML-4 at 100° C. | 62 |
| Microstructure | |
| % Cis-1,4 | 97.9 |
| % Trans-1,4 | 1.1 |
| % 1,2 | 1.0 |

EXAMPLES 14-17

These examples illustrate the effect on the polymerization rate of 1,3-butadiene of including an alcohol in the catalyst system. In this evaluation, polymerizations were compared using catalyst systems with and without alcohol components. Thus, two polymerization experiments were conducted using a catalyst system containing TIBAL, NiOB and $BF_3OEt_2$ (Examples 14 and 15) and two polymerization experiments were conducted using the same three components and ethanol (Examples 16 and 17). In Examples 14 and 15, the polymerizations were conducted substantially in accordance with the procedure of Example 7. In Examples 16 and 17, the polymerizations were conducted substantially in accordance with Example 7 except that ethanol was included in the catalyst system and the catalyst components were charged to the polymerization vessels in the following order: (1) TIBAL (18 weight percent) in hexane, (2) ethanol (0.1 molar) in hexane (hereinafter EtOH), (3) NiOB in hexane and $BF_3OEt_2$ neat. The polymerizations were conducted in accordance with the general procedure of Example 7 in the following manner.

To each of a series of four 28 oz. beverage bottles equipped with rubber liner and three hole crown cap were charged 270 grams of purified BD/Hexane blend containing 65 grams of 1,3-butadiene. Then, the above catalyst components were charged to each bottle. After addition of catalyst components were completed, polymerizations were conducted at 50° C. in a water bath for 60 minutes (Examples 14 and 16) and 120 minutes (Examples 15 and 17) respectively. The polymerizations were terminated and the resultant polymers recovered and dried using the procedures set forth in Example 7.

The weights and molar ratios of the various components, the polymerization conditions and the properties of the resultant polymers are shown in Table IV.

TABLE IV

| Example # | 14 | 15 | 16 | 17 |
|---|---|---|---|---|
| 1,3 BD, grams | 65 | 65 | 65 | 65 |
| NiOB, mM phgm | 0.073 | 0.073 | 0.073 | 0.073 |
| TIBAL, mM phgm | 0.730 | 0.730 | 0.730 | 0.730 |
| $BF_3OEt_2$, mM phgm | 1.030 | 1.030 | 1.030 | 1.030 |
| EtOH, mM phgm | — | — | 0.204 | 0.204 |
| Molar Ratios: | | | | |
| Ni/AL/B | 1/10/14 | → | → | → |
| EtOH/Ni | — | — | 2.8/1.0 | 2.8/1.0 |
| Type Catalyst Addition | In-situ | → | → | → |
| Polymerization Conditions: | | | | |
| Temp. °C. | 50 | 50 | 50 | 50 |
| Time-Min. | 60 | 120 | 60 | 120 |
| Conversion % | 29.6 | 48.5 | 71.0 | 93.2 |
| Polymer Properties Microstructure | | | | |
| % Cis-1,4 | 98.2 | 98.0 | 98.6 | 98.4 |
| % Trans-1,4 | 1.4 | 1.4 | 1.1 | 1.1 |
| % 1,2 | 0.4 | 0.6 | 0.4 | 0.5 |
| DSV | 1.42 | 1.40 | 2.16 | 2.06 |

As will be evident from the above data, the addition of ethanol to the catalyst system increases the rate of polymerization and the molecular weight of the resulting polymer.

EXAMPLES 18-22

These examples illustrate the effect on polymerization of varying the amounts of ethanol added to the catalyst system and the use of a preformed ¶ allyl nickel complex formed in the presence of ethanol.

To each of five 28 oz. beverage bottles equipped with rubber liner and three hole crown cap were charged 330 grams of a purified BD/Hexane blend containing 80.8 grams of 1,3-butadiene. Then, the following catalyst components were charged to each bottle in the following order: (1) TIBAL (18 weight percent) in hexane, (2) EtOH in hexane and (3) NiOB in hexane. After addition of the three catalyst components was completed, the bottles were tumbled in a water bath at 50° C. for 60 minutes. The bottles were then removed from the water bath and $BF_3OEt_2$ was charged to each bottle. The bottles were placed back into the water bath and polymerization was conducted at 50° C. for 120 minutes. The polymerizations were terminated and the resultant polymers recovered and dried as in Example 7.

The weights and molar ratios of the various components, polymerization conditions and the properties of the resultant polymers are shown in Table V.

TABLE V

| Example # | 18 | 19 | 20 | 21 | 22 |
|---|---|---|---|---|---|
| 1,3 BD, grams | 80.8 | 80.8 | 80.8 | 80.8 | 80.8 |
| NiOB, mM phgm | 0.55 | 0.55 | 0.55 | 0.55 | 0.55 |
| TIBAL, mM phgm | 0.55 | 0.55 | 0.55 | 0.55 | 0.55 |
| $BF_3OEt_2$, mM phgm | 0.55 | 0.55 | 0.55 | 0.55 | 0.55 |
| EtOH, mM phgm | 0.55 | 1.10 | 1.65 | 2.20 | 2.75 |
| Molar Ratios: | | | | | |
| Ni/AL/B | 1/1/1 | 1/1/1 | 1/1/1 | 1/1/1 | 1/1/1 |
| EtOH/Ni | 1/1 | 2/1 | 3/1 | 4/1 | 5/1 |
| Type Catalyst Addition | | | | | |
| 1. AL/EtOH/NiOB | Preformed | → | → | → | → |
| Temp °C. | 50 | 50 | 50 | 50 | 50 |
| Time-Min. | 60 | 60 | 60 | 60 | 60 |
| 2. $BF_3OEt_2$ | → | → | → | → | → |
| Polymerization Conditions: | | | | | |
| Temp. °C. | 50 | 50 | 50 | 50 | 50 |
| Time-Min | 120 | 120 | 120 | 120 | 120 |
| Conversion % | 73.9 | 83.4 | 94.6 | 92.7 | 75.9 |
| Polymer Properties Microstructure | | | | | |
| % Cis-1,4 | 98.4 | 98.0 | 98.2 | 98.3 | 98.6 |
| % Trans-1,4 | 1.1 | 1.3 | 0.7 | 0.6 | 0.5 |
| % 1,2 | 0.5 | 0.7 | 1.1 | 1.1 | 0.9 |
| DSV | 2.53 | 2.34 | 2.44 | 2.27 | 2.67 |

EXAMPLES 23-26

In these examples, Example 19 was substantially repeated except that different alcohols were used in place of ethanol. The molar ratios of the catalyst components, the alcohols tested and the properties of the resultant polymers are shown in Table VI.

TABLE VI

| Example # | 23 | 24 | 25 | 26 |
|---|---|---|---|---|
| Molar Ratios: | | | | |
| Ni/AL/B | 1/1/1 | 1/1/1 | 1/1/1 | 1/1/1 |
| ROH/Ni | 1/1 | 1/1 | 1/1 | 1/1 |
| ROH | t-butanol | n-hexanol | n-octanol | n-dodecanol |
| Conversion % | 88.2 | 82.1 | 92.7 | 76.7 |
| Polymer Properties Microstructure | | | | |
| % Cis-1,4 | 92.3 | 99.1 | 98.0 | 99.2 |
| % Trans-1,4 | 7.1 | 0.5 | 0.6 | 0.6 |
| % 1,2 | 0.6 | 0.4 | 1.4 | 0.2 |
| DSV | 1.14 | 2.67 | 2.12 | 2.98 |
| % Gel | 0 | 0 | 0 | 0 |

EXAMPLES 27-30

These examples illustrate the ability to conduct polymerizations at high temperatures using the catalyst system of the invention.

In these examples, preformed ¶ allyl nickel catalyst complexes were prepared in the presence of ethanol using a similar procedure to that described in Examples 18-22 with the exception that the temperatures and times used in the preforming procedures were varied. The preformed catalysts were prepared by charging the following components in the following order: (1) 120 grams of purified BD/Hexane blend containing 30 weight percent of 1,3-butadiene, (2) TIBAL (18 weight percent) in hexane, (3) ethanol in hexane and (4) NiOB in hexane.

A series of polymerizations were then conducted by charging the preformed catalysts at room temperature to a 2 gallon reactor which had been previously charged with 3632 grams of a purified BD/Hexane blend containing 698 grams of 1,3-butadiene. The reactor was then heated under the conditions shown in Table VII. A solution of $BF_3OEt_2$ in 60 grams of purified BD/Hexane blend containing 25 weight percent of 1,3-butadiene was then charged to the reactor. Polymerizations were then conducted using various temperatures and times. Polymerizations were terminated and the resultant polymers recovered and dried as in Example 13. The weights and molar ratios of the components, the polymerization conditions, and the properties of the resultant polymers are shown in Table VII.

TABLE VII

| Example # | 27 | 28 | 29 | 30 |
|---|---|---|---|---|
| 1,3-BD, grams | 698 | 698 | 698 | 698 |
| NiOB, mM phgm | 0.5 | 0.5 | 0.5 | 0.5 |
| Molar Ratios: | | | | |
| Ni/AL/B | 1/1/1 | 1/1/1 | 1/1/1 | 1/1/1 |
| EtOH/Ni | 2/1 | 3.5/1 | 3.5/1 | 3.5/1 |
| Type Catalyst Addition | | | | |
| 1. AL/EtOH/NiOB (preformed) | | | | |
| Temp °C. | 80 ± 3 | 80 ± 3 | 50 ± 5 | 50 ± 5 |
| Time-Min. | 15 | 15 | 15 | 15 |
| 2. $BF_3OEt_2$-Temp°C. | 40 | 40 | 50 | 50 |
| Polymerization Conditions: | | | | |
| Temp °C. | 82 ± 3 | 82 ± 3 | 100 ± 2 | 121 |
| Time-Hrs. | 4 | 5 | 3 | 3.5 |
| Conversion % | 78.9 | 85.5 | 91.0 | 100 |
| Polymer Properties Microstructure | | | | |
| % Cis-1,4 | 97.6 | 96.7 | 94.0 | 91.3 |
| % Trans-1,4 | 1.1 | 2.3 | 4.7 | 6.9 |
| % 1,2 | 1.3 | 1.0 | 1.3 | 1.8 |
| DSV | 3.07 | 3.55 | 2.71 | 2.31 |
| % Gel | 0 | 0 | 0 | 0 |
| ML-4 at 100° C. | 56 | 70 | 56 | 40 |

EXAMPLES 31-34

In these examples, polymerizations were conducted using preformed catalysts in accordance with the following procedure.

The preformed catalysts were first prepared by charging the following components to 28 oz. beverage bottles in the following order: (1) 200 ml of a purified BD/Hexane blend containing 25 weight percent of 1,3-butadiene, (2) TIBAL in hexane, (3) ethanol in hexane, (4) NiOB in hexane and (5) $BF_3OEt_2$ (neat). The resultant preformed catalyst was then charged at room temperature to a 1 gallon reactor which had previously been charged with 1816 grams of a BD/Hexane blend containing 300 grams of 1,3-butadiene. Polymerizations were then conducted at various temperatures and times. The polymerizations were terminated and the resultant polymers recovered and dried as in Examples 1-6.

The weights and molar ratios of the various components, the polymerization conditions, and the properties of the resultant polymers are shown in Table VIII. The polymers were additionally tested for green strength and tack in accordance with the procedure set forth in Examples 8-12. Results are also shown in Table VIII.

TABLE VIII

| Example # | 31 | 32 | 33 | 34 |
|---|---|---|---|---|
| 1,3-BD, grams | 300 | 300 | 300 | 300 |
| NiOB, mM phgm | 0.5 | 0.5 | 0.5 | 1.0 |
| Molar Ratios: | | | | |
| Ni/AL/B | 1/1.5/1 | 1/1.5/1 | 1/1.5/1 | 1/1.5/1.5 |
| EtOH/Ni | 1/1 | 3/1 | 3/1 | 5.25/1 |
| Polymerization Conditions: | | | | |
| Temp °C. | 50 | 70 | 70 | 82 |
| Time-Hrs. | 22 | 5.5 | 5.5 | 18 |
| Conversion % | 76.7 | 89.4 | 84.8 | 70.0 |
| Polymer Properties Microstructure | | | | |
| % Cis-1,4 | 97.8 | 97.4 | 97.9 | 94.1 |
| % Trans-1,4 | 0.9 | 1.0 | 0.7 | 3.9 |
| % 1,2 | 1.3 | 1.7 | 1.4 | 2.0 |
| DSV | 3.56 | 3.14 | 3.37 | 3.94 |
| $\overline{Mw}$ | 641,000 | 517,000 | 600,000 | 748,000 |
| Green Strength | | | | |
| Initial, psi | 30 | 30 | 35 | 35 |
| Peak, psi | 140 | 70 | 78 | 130 |
| Break, psi | 140 | 70 | 78 | 130 |
| Elongation % | 905 | 1115 | 1250 | 1215 |
| Tack, ppi | 11.0 | 8.5 | 9.5 | 12.5 |

EXAMPLES 35–39

These examples illustrate the use of an organolithium compound as the reducing agent in the catalyst systems of the invention. In these examples, polymerizations were conducted using a procedure similar to that of Example 7 except that n-butyl lithium was utilized in place of TIBAL. The catalyst components were charged by the in-situ technique by charging the components to 28 oz. beverage bottles in the following order: (1) NiOB in hexane, (2) n-butyl lithium in hexane, and (3) BF$_3$OEt$_2$ (neat).

The weights and molar ratios of the various components, the polymerization conditions, and the properties of the resultant polymers are shown in Table IX.

TABLE IX

| Example # | 35 | 36 | 37 | 38 | 39 |
|---|---|---|---|---|---|
| 1,3 BD, grams | 80.8 | 80.8 | 80.8 | 80.8 | 80.8 |
| NiOB, mM phgm | 0.225 | 0.225 | 0.225 | 0.112 | 0.112 |
| Molar Ratios: | | | | | |
| Ni/Li/B | 1/1/1.5 | 1/1.5/1.5 | 1/2/1.5 | 1/1.5/1 | 1/1.5/1.5 |
| Type Catalyst Addition | In-situ | → | → | → | → |
| Polymerization Conditions: | | | | | |
| Temp. °C. | 50 | 50 | 50 | 50 | 50 |
| Time-Hrs. | 3 | 3 | 3 | 3 | 3 |
| Conversion % | 94.8 | 87.0 | 46.8 | 87.3 | 92.9 |
| Polymer Properties Microstructure | | | | | |
| % Cis-1,4 | 94.6 | 96.2 | 96.8 | 95.6 | 97.1 |
| % Trans-1,4 | 3.7 | 1.7 | 1.5 | 2.8 | 0.9 |
| % 1,2 | 1.7 | 2.1 | 1.7 | 0.9 | 2.0 |
| DSV | 1.17 | 1.47 | 1.74 | 1.20 | 1.85 |
| % Gel | 0 | 0 | 0 | 0 | 0 |

We claim:

1. A method of preparing diene polymers having a high content of cis-1,4 addition and good green strength and tack comprising polymerizing a 1,3-diene monomer in a hydrocarbon solvent in the presence of a catalytically effective amount of a catalyst composition which comprises:

(a) a carboxylated metal oxy borate compound selected from the group consisting of compounds represented by the formulae (RCOOMO)$_3$B and (RCOOMO)$_2$BOR', wherein R and R' are alkyl radicals containing from 7 to 17 carbon atoms, and M is nickel or cobalt;

(b) an organometallic compound in which the metal is selected from Groups I, II, and III of the Periodic System; and (c) one or more fluorine containing compounds selected from the group consisting of boron trifluoride complexes with ethers, alcohols or mixtures thereof; hydrogen fluoride; hydrogen fluoride complexes with ethers, alcohols or mixtures thereof and mixtures of said compounds.

2. The method of claim 1 wherein said diene polymer is a polybutadiene polymer having a cis-1,4 addition content of from about 90 to about 99%.

3. The method of claim 1 wherein said hydrocarbon solvent is an aliphatic, cycloaliphatic or aromatic hydrocarbon solvent.

4. The method of claim 1 wherein said hydrocarbon solvent is hexane.

5. The method of claim 1 wherein said 1,3-diene monomer is polymerized at a temperature of from about −10° C. to about 150° C.

6. The method of claim 1 wherein said 1,3-diene monomer is polymerized at a temperature from about 50° C. to about 130° C.

7. The method of claim 1 wherein said carboxylated metal oxy borate compound is a compound represented by the formula (RCOOMO)$_3$B in which R is an alkyl radical containing from 7 to 11 carbon atoms and M is cobalt or nickel.

8. The method of claim 1 wherein said organometallic compound is selected from the group consisting of organoaluminum, organolithium, organomagnesium, and organozinc compounds.

9. The method of claim 1 wherein said organometallic compound is triisobutyl aluminum.

10. The method of claim 1 wherein said organometallic compound is n-butyl lithium.

11. The method of claim 1 wherein said boron trifluoride complex is a boron trifluoride complex with an ether represented by the formula R'OR wherein R and R' may be alkyl, cycloalkyl, aryl, alkaryl, and arylalkyl radicals containing from 1 to 30 carbon atoms and wherein R and R'may be the same or different.

12. The method of claim 9 wherein said boron trifluoride ether complex is boron trifluoride diethyl ether.

13. The method of claim 6 wherein said boron trifluoride complex is a boron trifluoride complex with an alcohol represented by the formula ROH wherein R is an alkyl, cycloalkyl, aryl, or arylalkyl radical containing from 1 to 30 carbon atoms.

14. The method of claim 1 wherein said boron trifluoride alcohol complex is a boron trifluoride-ethanol complex or a boron trifluoride-octanol complex.

15. The method of claim 1 wherein the molar ratio of components a:b:c of the catalyst composition ranges from about 1:1:1 to about 1:70:70.

16. The method of claim 1 wherein the molar ratio of components a:b:c ranges from 1:1.5:1.5 to 1:15:15.

* * * * *